Figure 1:
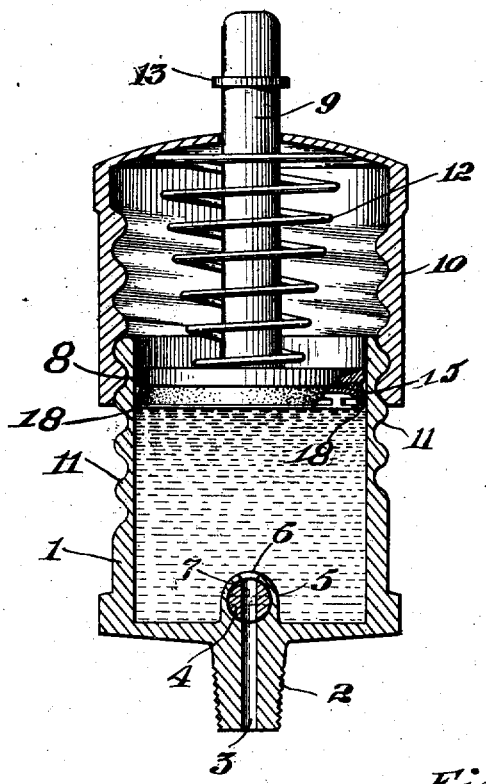

No. 12,666. REISSUED JUNE 25, 1907.

J. POWELL.

GREASE CUP.

APPLICATION FILED JAN. 12, 1907.

Attest:

E. Mitchell

M. L. Hart by

Inventor:

James Powell

Ralph C. Powell Atty

THE NORRIS PETERS CO., WASHINGTON, D. C.

UNITED STATES PATENT OFFICE.

JAMES POWELL, OF CINCINNATI, OHIO, ASSIGNOR TO THE WM. POWELL CO., OF CINCINNATI, OHIO, A CORPORATION OF OHIO.

GREASE-CUP.

No. 12,666. Specification of Reissued Letters Patent. Reissued June 25, 1907.

Original No. 824,882, dated July 3, 1906. Application for reissue filed January 12, 1907. Serial No. 352,066.

*To all whom it may concern:*

Be it known that I, JAMES POWELL, a citizen of the United States, residing at Cincinnati, in the county of Hamilton and State of Ohio, have invented a new and useful Grease-Cup, of which the following is a specification.

My invention relates to improvements in lubricating devices commonly known as grease cups, by means of which a more or less viscous lubricant may be automatically fed to the parts to be lubricated. Such devices ordinarily comprise a grease container or cup having a vent through which the grease is fed and a plunger or follower usually actuated by spring pressure for forcing the feed of the grease through the vent. The great difficulty encountered in devices of this character is that by reason of the imperfect fit of the follower in the cup the grease leaks past and to the rear of said follower, thus rapidly diminishing the available supply and making it necessary to replenish the cup frequently, as well as to remove the grease uselessly accumulated back of the follower. Manufacturers of this class of lubricators have attempted to obviate this difficulty by the use of a flat leather or other flexible washer or packing between plates on the end of the follower's plunger, the diameter of which packing is fitted more or less snugly within the interior of the cup. This packing, however, soon becomes worn in use, and there being no means to compensate for such wear the grease is permitted eventually to escape to the rear of the follower as before. In order to provide compensation for such wear, so called cup leather packings have been devised consisting of a leather packing having a depending lip which, when the follower is under feeding pressure, is continually expanded outwardly by the grease against the walls of the cup, thus taking up any wear which may occur. The flexibility and expansibility of this packing lip, however, renders the same extremely liable to be turned back and reversed or mutilated when the follower is being reinserted after each filling of the cup.

My present invention aims, among other things, not only to utilize the compensating effect of cup leather packing, but to avoid the common defects of this type by providing a means in conjunction with the improved flexible packing to so overlie and protect the edge thereof as to facilitate the insertion of the follower in the cup and to prevent the displacement and mutilation of the packing when being so inserted.

My invention will be best understood from a description of the particular embodiment thereof illustrated in the accompanying drawings in which—

Figure 2:
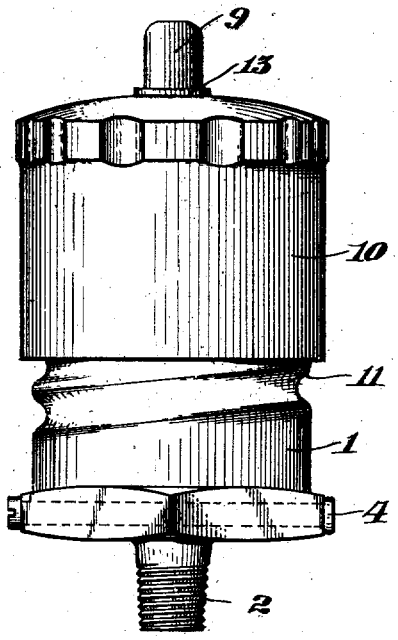
Figure 3:
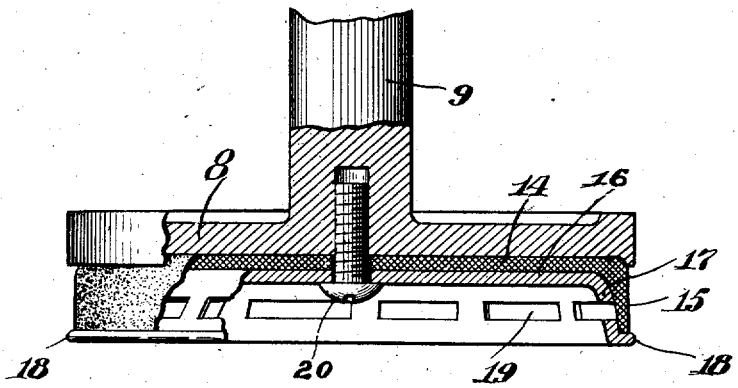

Figure 1 is a view in vertical section of a preferred form of my grease cup. Fig. 2 is a side elevation of the same; and Fig. 3 is a detail view partly in section of the follower.

In the embodiment of my invention here shown, the grease cup comprises the grease container or cup proper 1, having a screw threaded attaching nipple 2 provided with the vent 3 through which the grease is fed. To control the feed, a key 4 is provided, mounted in a housing 5 on the bottom of the cup, the key and housing, as shown in Fig. 1, being bored at 6 and 7 respectively so that when the key is properly positioned the grease may be fed through vent 3. The ends of the key project slightly at each side of the cup to afford access for manipulation.

Within the cup 1 is mounted a plunger follower 8 having a stem 9 which projects through a suitable aperture in a cap or cover 10 which in turn is mounted adjustably upon the cup 1 by means of the screw thread 11. To actuate the follower automatically in its feeding movement, a suitable spring 12 is interposed between the follower head 6 and the top of the cap 8.

When the cup 1 has been supplied with grease the parts are assembled with the follower resting on top of the grease, whereupon the cap 10 may be screwed down upon the cup 1 until the required feeding pressure is exerted upon the follower by the pressure spring 12, when, upon turning the key 4, the grease is fed under pressure through the vent 3. The cap and follower are held assembled, especially when removed from the cup, by means of the collar 13 on the follower stem 9 which limits the spring movement of the follower in the cap and also serves when the parts are assembled to indicate the stage of the grease supply in the cup. As the supply of grease diminishes the cap may be screwed further down upon the cup 1, thus renewing the feeding pressure exerted by the spring on the follower, until the latter in its descent reaches the bottom of the cup and the supply of grease is exhausted.

To prevent leakage of the grease past and to the rear of the follower, I provide the improved form of follower packing illustrated in Fig. 3 comprising the inverted cup shaped flexible packing 14 having an expansible lip 15 which is adapted under the feeding pressure of the follower to be expanded by the grease against the interior wall of the cup and thus form a very close, but, at the same time, yielding fit therewith.

The close fit of the packing together with its flexibility and expansibility as usually constructed renders insertion of the follower within the cup extremely difficult as the flexible lip 15 is very apt to be turned back and reversed or badly mutilated by the edge of the cup. To obviate this difficulty, I provide means for supporting and protecting the lip and also for keeping it in shape, which means comprises a rigid lining plate 16 having a depending lip 17 which extends in supporting position beneath the flexible lip 15 of the packing 14, and has a laterally extending flange 18 which overlies and extends beyond and in advance of the edge of the flexible lip 15 of the packing when the follower is prepared for insertion within the grease cup. This depending lip of the lining plate 16 is provided with perforations 19 for permitting the grease to have access to the interior face of the flexible packing lip 15 and to expand the same to fit the wall of the cup closely when the follower is exerting feeding pressure on the grease as shown in Fig. 1.

The diameter of the depending flange 17 of the lining plate 16 may be such as to permit the flexible packing lip 15 to be contracted well within the perimeter of the lip 18 so that upon insertion of the follower in the cup there will be no liability of the flexible lip coming in contact with the edge of the cup and being turned back and reversed or mutilated thereby.

The flexible packing together with the lining and supporting plate may be secured to the follower head 6 by means of a screw 20.

The construction and relative arrangement of parts may be varied without departing from the spirit and scope of my invention.

Claims:

1. A lubricating device comprising a grease container, or cup having a feeding vent, an adjustable cap therefor, and an automatically operated feeding follower fitted within the cup and having an expansible packing and a fixed support adapted to project beyond the edge of said packing to prevent said edge from being turned back and reversed or mutilated in the act of inserting the follower within the cup, and serving also to guide the follower in the cup.

2. A lubricating device comprising a grease container, or cup having a feeding vent, an adjustable cap therefor, and an automatically operated feeding follower fitted within the cup and having an expansible packing provided with a depending lip, and a fixed support adapted to project beyond the edge of said lip to prevent it from being turned back and reversed or mutilated in the act of inserting the follower within the cup, and serving also to guide the follower in the cup.

3. A lubricating device comprising a grease container or cup having a feeding vent, an adjustable cap therefor and an automatically operated feeding follower fitted within the cup, and having an expansible packing and alining plate therefor having a flange adapted to project beyond the edge of said packing to prevent said edge from being turned back and reversed or mutilated in the act of inserting the follower within the cup, said plate serving also to guide the follower in the cup.

4. A lubricating device comprising a grease container, or cup having a feeding vent, an adjustable cap therefor and an automatically operated feeding follower fitted within the cup and having an expansible packing provided with a depending lip and a lining plate for said packing having a flange adapted to project beyond the edge of said lip to prevent said edge from being turned back and reversed or mutilated in the act of inserting the follower within the cup, said plate serving also to guide the follower in the cup.

5. A lubricating device comprising a grease container or cup having a feeding vent, an adjustable cap therefor and an automatically operated feeding follower fitted within the cup and having an expansible packing provided with a depending lip and a lining plate also having a depending lip to support said packing lip, and having means adapted to project beyond the edge of said packing lip to prevent the said edge from being turned back and reversed or mutilated in the act of inserting the follower within the cup, said plate serving also to guide the follower in the cup.

6. A lubricating device comprising a grease container, or cup having a feeding vent, an adjustable cap therefor and an automatically operated feeding follower fitted within the cup and having an expansible packing provided with a depending lip and a lining plate for said packing having a flange adapted to project beyond the edge of said lip to prevent said edge from being turned back and reversed or mutilated in the act of inserting the follower within the cup, said lining plate having apertures to permit access of the grease to the inner side of and to cause expansion of said packing lip against the walls of the cup when under feeding pressure, said plate serving also to guide the follower in the cup.

7. A lubricating device comprising a grease container, or cup having a feeding vent, an adjustable cap therefor and an automatically operated feeding follower fitted within the cup and having an expansible packing provided with a depending lip and a lining plate also having a depending lip to support said packing lip, and having means adapted to project beyond the edge of said packing lip to prevent said edge from being turned back and reversed or mutilated in the act of inserting the follower within the cup, the lip of the lining plate having apertures to permit access of the grease to the inner side of and to cause expansion of said packing lip against the walls of the cup when under feeding pressure, said plate serving also to guide the follower in the cup.

8. A lining plate for the flexible packing of a feeding follower having means adapted to project beyond the edge of said flexible packing to facilitate insertion of the follower in its containing vessel.

9. A lining plate for the flexible packing of a feeding follower having a depending lip to support said packing, and means adapted to project beyond the edge of said packing and facilitate insertion of said follower in its containing vessel.

10. A lining plate for the flexible packing of a feeding follower having means adapted to project beyond the edge of said flexible packing to facilitate insertion of the follower in its containing vessel, and having perforations near its periphery to permit the material being fed to expand the flexible packing against the walls of said vessel.

11. A lining plate for the flexible packing of a feeding follower having a depending lip to support the periphery of said flexible packing, and means adapted to project beyond the edge of said packing to facilitate insertion of the follower in its containing vessel, said lip being perforated to permit the material being fed to expand the flexible packing against the walls of said vessel.

12. In a lubricator of the kind described, the combination with the essential parts thereof which comprise a container and a follower fitted thereinto to expel the contents, of a cup-leather packing secured to said follower which has a yielding flange fitted to bear directly against the side of the container and a cup-shaped lining secured within the cup-leather and projecting over the free edge of its flange for the purpose described.

In testimony whereof I affix my signature in the presence of two witnesses.

JAMES POWELL.

Witnesses:

RALPH C. POWELL,

M. D. HART.